United States Patent [19]
Maxson

[11] 3,935,632
[45] Feb. 3, 1976

[54] METHOD OF PREPARING AN INSULATED NEGATIVE BUOYANCY FLOW LINE

[75] Inventor: Orwin G. Maxson, Ponca City, Okla.

[73] Assignee: Continental Oil Company, Ponca City, Okla.

[22] Filed: July 2, 1973

[21] Appl. No.: 375,574

[52] U.S. Cl. ............... 29/455 R; 29/460; 138/149; 138/DIG. 9; 264/45.4; 264/46.4; 264/46.9; 264/109; 264/DIG. 7; 264/DIG. 6
[51] Int. Cl.² ......................................... B29D 27/04
[58] Field of Search .......... 264/45, 45.4, 46.5, 46.9, 264/DIG. 6, DIG. 7, 122; 29/455, 460

[56] References Cited
UNITED STATES PATENTS

| | | | |
|---|---|---|---|
| 2,958,905 | 11/1960 | Newberg et al. | 264/51 |
| 3,124,626 | 3/1964 | Graham et al. | 264/45 |
| 3,388,724 | 6/1968 | Mowell et al. | 138/149 |
| 3,394,207 | 7/1968 | Andersen | 264/45 |
| 3,439,075 | 4/1969 | Bauer et al. | 264/45 |
| 3,444,279 | 5/1969 | Dost | 264/45 |
| 3,453,716 | 7/1969 | Cook | 138/149 X |
| 3,491,171 | 1/1970 | French | 264/45 |
| 3,793,411 | 2/1974 | Stonitsch et al. | 264/45 |

FOREIGN PATENTS OR APPLICATIONS
875,929   7/1971   Canada ........................ 264/53

OTHER PUBLICATIONS
Syntactic Foams for Deep Sea Engineering Applications, Naval Engineers Journal, Apr. 1968, pp. 235–242.

*Primary Examiner*—Philip Anderson
*Attorney, Agent, or Firm*—Richard W. Collins

[57] ABSTRACT

Method of preparing an insulated negative buoyancy conduit wherein a jacket is placed around the conduit and an insulating material comprising a porous filler and a resin-forming composition is positioned in the annulus between the jacket and the conduit.

5 Claims, 2 Drawing Figures

METHOD OF PREPARING AN INSULATED NEGATIVE BUOYANCY FLOW LINE

BACKGROUND OF THE INVENTION

1. Field of the Invention

The present invention relates to an insulated conduit for transporting fluids which conduit has a negative buoyancy when positioned in a liquid. More particularly, the invention relates to a method of making such a conduit which will sink to the bottom of a body of water.

2. Description of the Prior Art

In many instances, it is desirable to insulate conduits so that the temperature drop of fluids flowing through the conduit is held to a minimum. Conduits carrying fluids from gas condensate wells are an example. Gas condensate as it is produced from a well is at a relatively high temperature. If the temperature drops considerably in the conduit used to transport the gas condensate from the well to a point of further use, additional liquid can condense and cause blockage of the flow line. In other instances, oil is produced from a well at a relatively high temperature at which it has a low viscosity and is easy to transport through conduits. However, if the temperature drop of the oil passing through the conduit is great, the oil can become viscous and difficult to move. The oil may also contain paraffinic constituents which can come out of solution if the temperature drops, adhere to the conduit walls, and cause plugging of the conduit. In other instances, it is desired to transport a fluid from one point to another point and deliver the fluid as near as possible at its temperature at the point of origin. Therefore, there are many instances in which it is desirable to insulate conduits used in transporting fluids.

Oftentimes conduits are submerged in a liquid. For example, oil and gas gathering conduits from offshore wells are located beneath the surface of water. Insulation material is characteristically of the surface of water. Insulation material is characteristically of low density. If an adequate amount of insulation material is positioned around the conduit, the insulated conduit may become buoyant and tend to float in the liquid which surrounds it. This buoyancy can be onerous if it is desirable that the conduit be positioned beneath the surface of the liquid through which it passes, such as along the bottom of a body of water.

It is an object of this invention to provide a process for constructing an insulated negative buoyancy conduit. It is a further object to provide such a process which may be easily carried out using known materials of construction. It is a still further object to provide a process for constructing such a conduit having a water resistant insulation. It is another object to provide a process for constructing such a conduit which has a first structure to prevent heat loss and an additional structure which protects the first structure from the surrounding liquid media. Other objects, advantages, and features will become apparent from a consideration of the following discussion and appended claims.

SUMMARY OF THE INVENTION

A method of preparing an insulated negative buoyancy conduit comprising concentrically positioning a jacket around the conduit and placing an insulating material comprising a porous filler and a resin-forming composition in the annular space between the jacket and the conduit.

DESCRIPTION OF THE PREFERRED EMBODIMENT

Figures 1, 2:
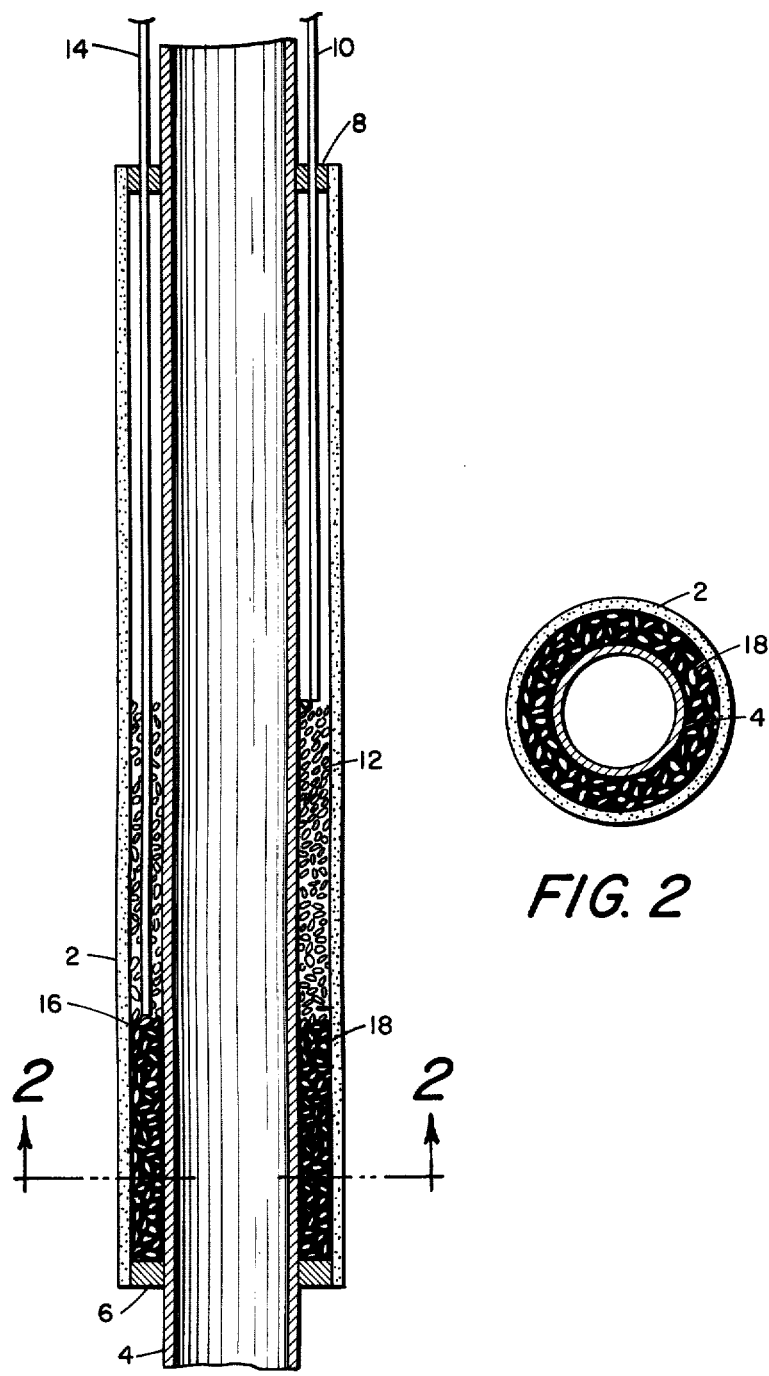
FIG. 1 is a longitudinal sectional view of the conduit of the present invention.
FIG. 2 is a cross-sectional view of the conduit.

Referring to FIGS. 1 and 2, the composite structure of this invention is made up of conduit 4 surrounded by insulation 18 surrounded by jacket 2. The composite is designed for use while submerged in a liquid. Conduit 4 can be of any suitable material. Most fluid handling conduits are metal, ceramic, cement, or plastic. Conduits for gathering fluids from offshore wells are generally steel. Jacket, sheath, or sleeve 2 which is concentrically positioned around the conduit can be made of materials similar to those used in conduit 4. Jacket 2 should be of sufficient thickness and density so as to add sufficient weight to the composite to make the density of the composite equal to or greater than the density of the liquid in which the composite is to be submerged. Particularly useful are jackets made of cement. The composite structure may be submerged in any desired liquid either aqueous or oleaginous. Of particular interest is water or brine, such as bodies of water in which wells are often drilled.

Insulation material 18 is a lightweight material consisting of low density porous filler 12 integrally cast and embedded in resin 16. Such insulation material 18 has light weight, high strength, is resistant to water absorption, and has excellent insulating properties. Porous filler 12 can be a hollow microsphere or a rigid predominately closed-cell foam. Examples of hollow microspheres are glass spheres having a diameter of 20 to 80 microns and fly ash microspheres. Rigid foams can be made from thermosetting resins such as urethane, epoxies, phenolics, urea-formaldehyde, or silicones. Foams can also be made from thermoplastic resins such as polystyrene, vinyls, polyolefins, and cellulosics.

It is preferred to make jacket 2 a few inches shorter than a length of conduit 4. When two lengths of conduit 4 are joined together, as by a coupling or by welding, preformed, short sections of insulation 18 and jacket 2 can be placed over the coupling area to make a composite of uniform diameter which is completely insulated.

In assembling a joint of composite structure, a section of jacket is concentrically positioned around a section of conduit 4. A solid doughnut-shaped first spacer element 6 is positioned at one end of the annulus between jacket 2 and conduit 4. A similar second spacer element 8 fills the other end of the annulus. Insulation 18 is formed in situ in the annulus. Insulation 18 can be formed following placement of first spacer element 6 and before placement of second spacer element 8 by pouring porous filler 12 and resin-forming composition 16 into the annulus. The annulus may first be filled with porous filler 12 and then resin-forming composition 16 added to fill the void spaces around porous filler 12. Alternatively a mixture of the two components may be placed in the annulus. Generally from about 50 to 75 percent of the annular volume is filled with porous filler 12 and from 50 to 25 percent of the annular volume is filled with resin-forming composition 16.

In a preferred embodiment, second spacer element 8 is provided with at least one lateral aperture therethrough. Second spacer element 8 is positioned in the annulus following placement of first spacer element 6. Hollow probe 10 is inserted through the aperture in second spacer element 8 and guided to the opposite end of the annulus. Insulation material 18 is injected through probe 10 as probe 10 is withdrawn through the annulus. In a still further preferred embodiment, second spacer element 8 is provided with two lateral apertures therethrough. Hollow probes 10 and 14 are inserted through these apertues to the opposite end of the annulus. Porous filler 12 is injected into the annulus via probe 10 as probe 10 is withdrawn from the annulus. Resin-forming composition 16 is then injected into the annulus around porous filler 12 via probe 14 as probe 14 is withdrawn from the annulus.

One example of a suitable insulating material is a syntactic foam, i.e., a two-phase composite material consisting of hollow microspheres integrally cast in a resin matrix. The density of such composites ranges from about 30 to about 55 pounds per cubic foot. Such foams have a remarkably high strength-to-weight ratio. In similar foams, the hollow microspheres can be replaced by rigid foamed plastic.

EXAMPLE

An insulated negative buoyancy flow line for use in gathering fluids from offshore petroleum producing wells is assembled as follows: A 29-foot length of a Portland cement jacket having an inside diameter of 11 inches and a wall thickness of 2 inches is centrifugally cast in a steel mold from a Portland cement slurry. The cement jacket is steam cured in the mold. A 30-foot length of flow line having an outside diameter of 7 inches is preheated to a temperature of 300°F. The heated steel flow line is centered in the cement jacket, and a doughnut-shaped first steel element having an inside diameter of 7 inches, an outside diameter 11 inches, and a thickness of 2 inches is positioned in one end of the annulus. A similar second spacer element having two 1-inch lateral holes therethrough is positioned in the other end of the annulus. A hollow steel probe is inserted through each hole in the second spacer element, through the annular space, and down to the first spacer element at the opposite end of the annulus. A quantity of 1/16-inch diameter polystyrene expanded bead foam is blown into the annulus through one probe as that probe is withdrawn from the annulus. When the annulus is filled with polystyrene expanded bead foam, a catalyzed settable epoxy resin composition is injected into the annulus via the other probe as the other probe is withdrawn from the annulus. The epoxy resin is then allowed to set. The heat from the setting epoxy resin and the preheated steel flow line causes the polystyrene expanded bead foam to expand still further and helps completely fill the annulus with insulation. The resulting composite of steel flow line, cement jacket, and insulation of polystyrene expanded bead foam and epoxy resin has a density greater than that of water. Thus, the composite tends to settle to the bottom of any body of water in which it is installed.

While the foregoing description has dealt with certain specific embodiments to illustrate the process of this invention, it is to be understood that the invention may be embodied otherwise without departing from the spirit of the invention. Various modifications and substitutions of materials will suggest themselves to those skilled in the art.

What is claimed is:

1. A method of preparing an insulated negative buoyancy flow line comprising:
   a. positioning a section of jacket concentrically about a section of flow line to provide an annulus therebetween, the section of flow line extending beyond each end of the section of jacket;
   b. positioning a first solid spacer element in the annulus at one end thereof to close one end of the annulus;
   c. positioning a second solid spacer element in the other end of the annulus to close the other end of the annulus, said second solid spacer element being adapted for insertion of a pair of hollow probes therethrough into said annulus;
   d. inserting a pair of hollow probes through said second solid spacer element with the outlets thereof positioned near the closed one end of the annulus;
   e. filling the annulus with porous filler particles by injecting the particles through one of said hollow probes into said annulus and withdrawing said probe as the annulus is filled;
   f. injecting a settable resin-forming composition through the other of said hollow probes into the annulus around the porous filler particles and withdrawing said other probe as the resin-forming composition is injected; and
   g. allowing the resin forming composition to set.

2. The method of claim 1 wherein said porous filler particles are hollow microspheres.

3. The method of claim 1 wherein said porous filler particles are rigid predominantly closed-cell foam particles.

4. The method of claim 1 wherein said porous filler particles are polystrene expanded bead foam particles having a diameter of 1/16 inch, the settable resin-forming composition is a catalyzed settable epoxy resin composition, and the jacket is a cement jacket.

5. The process of claim 4 wherein the section of flow line, after the resin-forming composition has set, is joined to another section of insulated flow line and the portion of said flow line sections extending beyond the jacket sections thereof is covered by short sections of insulating material.

* * * * *